United States Patent [19]

Meline et al.

[11] Patent Number: 4,841,226
[45] Date of Patent: Jun. 20, 1989

[54] CAPACITIVE EXTENSOMETER WITH CURVED TARGET SURFACE

[75] Inventors: Harry R. Meline, Minnetonka; Eric L. Paulsen, Wayzata, both of Minn.

[73] Assignee: MTS Systems Corporation, Eden Prairie, Minn.

[21] Appl. No.: 103,538

[22] Filed: Oct. 1, 1987

Related U.S. Application Data

[63] Continuation-in-part of Ser. No. 893,799, Aug. 6, 1986.

[51] Int. Cl.[4] .................. G01R 27/26; G01L 1/00; G01B 5/00
[52] U.S. Cl. .................... 324/61 R; 33/788; 73/780
[58] Field of Search ............ 324/61 R, 61 P; 73/780; 33/125 B, 147 D, 148 D

[56] References Cited

U.S. PATENT DOCUMENTS

| 2,968,031 | 1/1961 | Higa | 324/61 R |
| 3,206,970 | 9/1965 | Dally et al. | 73/88.5 R |
| 3,400,331 | 9/1968 | Harris | 324/61 |
| 3,729,985 | 5/1973 | Sikorra | 73/88.5 R |
| 3,789,508 | 2/1974 | Meline | 33/148 D |
| 3,852,672 | 12/1974 | Nelson | 328/1 |
| 4,098,000 | 7/1978 | Egger | 33/148 D |
| 4,449,413 | 5/1984 | Pugh | 73/780 |
| 4,532,810 | 8/1985 | Prinz et al. | 33/147 D |

FOREIGN PATENT DOCUMENTS 3410840 6/1985 Fed. Rep. of Germany.

OTHER PUBLICATIONS

Holmes, Alan M. C. and Michael C. Dugan "Clip-On Extensometer", NASA TECH BRIEFS, pgs. 96 and 97, Jan./Feb. 1986.

Primary Examiner—Reinhard J. Eisenzopf
Assistant Examiner—Walter E. Snow
Attorney, Agent, or Firm—Kinney & Lange

[57] ABSTRACT

A capacitive extensometer has an extensometer frame formed of a pair of arms connected together about a hinge axis at first remote ends, and having second ends which include specimen contacting members for engaging the surfaces of a specimen to be tested. A capacitive type sensing arrangement is mounted on the arms, and is used with conventional circuitry for determining arm motion. The sensing is made so that it can be compensated for nonlinearities and minimizes undesirable extraneous effects by utilizing concave and convex shaped mating surfaces on the sensing elements. The ability to mount and protect the capacitor sensor approximately, while obtaining a relatively large output signal enhances the operability of the extensometer.

6 Claims, 2 Drawing Sheets

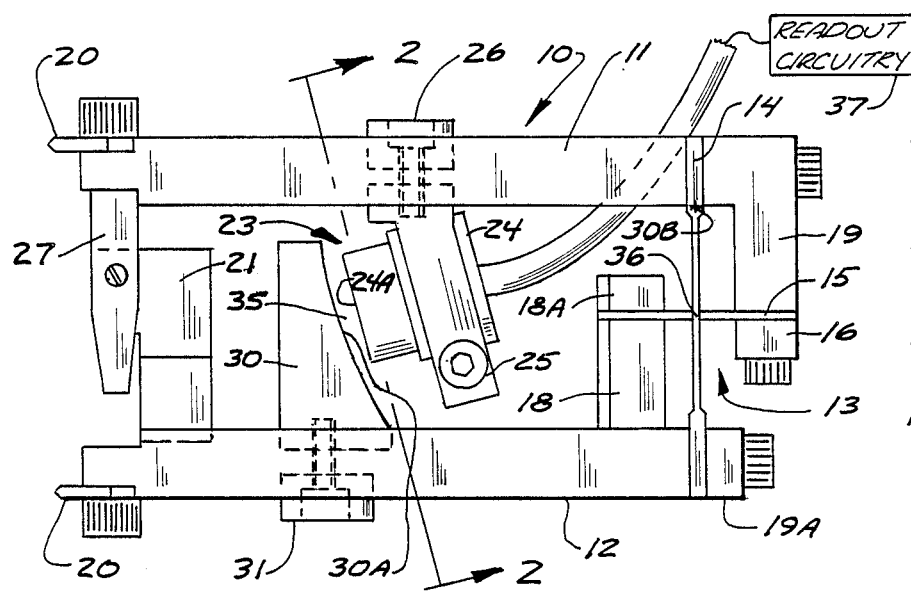

CAPACITIVE EXTENSOMETER WITH CURVED TARGET SURFACE

CROSS-REFERENCE TO RELATED APPLICATION

This application is a continuation-in-part of our co-pending application Ser. No. 893,799, filed Aug. 6, 1986.

BACKGROUND OF THE INVENTION

1. Field of the Invention

The present invention relates to capacitive extensometers.

2. Description of the Prior Art

Extensometers are commonly used for measuring strain in a specimen and includes devices which utilize two arms held together by suitable cross flexure members as shown in U.S. Pat. No. 3,789,508. Strain gages applied to the cross flexure members are used for determining arm separation, and thus, specimen strain.

Capacitive sensing extensometers are known as well, but generally they are complex in operation, hard to adjust, and are not rugged and easily attached to the specimens.

A capacitive crack opening displacement gauge is shown in U.S. Pat. No. 4,098,000. This device has the sensing units on an opposite side of the hinge axis or pivot axis from the specimen engaging members, and uses differential capacitive sensing plates.

A capacitive reactance gauge probe, or proximity probe that employs the principles of a probe used with the present invention is shown in U.S. Pat. No. 3,400,331, but does not show any specific uses in connection with extensometers.

Likewise, U.S. Pat. No. 3,206,970 shows a capacitor that has two cylindrical members, the gap between which is measured by capacitive sensing, and which cylindrical members are moved as a function of the movement being sensed. Direct spacing change between two capacitor plates is thus used for sensing in this device.

SUMMARY OF THE INVENTION

The present invention relates to a strain sensing extensometer having a capacitive reactance detector mounted on one of a pair of pivotally movable mounting arms joined by flexure straps, and adapted to engage a specimen, the strain of which is to be sensed by movement at the other ends of the arms. A capacitive reactance detector is mounted on one arm and faces a target so that upon movement of the arms, when a specimen to which they are coupled is subjected to load, a change in spacing between the target and detector is sensed and the amount of change in signal is proportional to the strain in the specimen.

The present construction provides a rugged extensometer that provides a very usable signal with small amounts of movement, and which is easily mounted and adjusted. The sensing members are mounted directly to the arms between the ends of the arms.

The capacitive reactance sensing probes used as shown herein are known. The probes have a center circular capacitive plate and an outer concentric sleeve capacitive plate, commonly called a guard ring. These plates do not move relative to each other, but provide a signal depending on the proximity of the probe end to a conductor target surface. For example, cylindrical capacitive reactance sensing probes made by Hitec Products, Inc. of Ayer, Mass., and sold as their HPC Series probes under the trademark "Proximic" have been shown to be suitable.

Properly configuring the target surface and positioning the target and moving the relatively movable members permits compensation for nonlinearities in the system. Mechanical compensation simplifies or eliminates the need for the correction or linearizing electronic circuitry that is commonly required, and enhances accuracy.

BRIEF DESCRIPTION OF THE DRAWINGS

FIG. 1 is a side elevational view of a capacitive extensometer made according to the present invention;

FIG. 2 is a sectional view taken as on line 2—2 of FIG. 1;

FIG. 3 is a side view of an extensometer made according to a modified form of the present invention showing a convex curved surface on the target and a mating surface of a capacitive reactance probe;

DETAILED DESCRIPTION OF THE PREFERRED EMBODIMENTS

Figure 4:
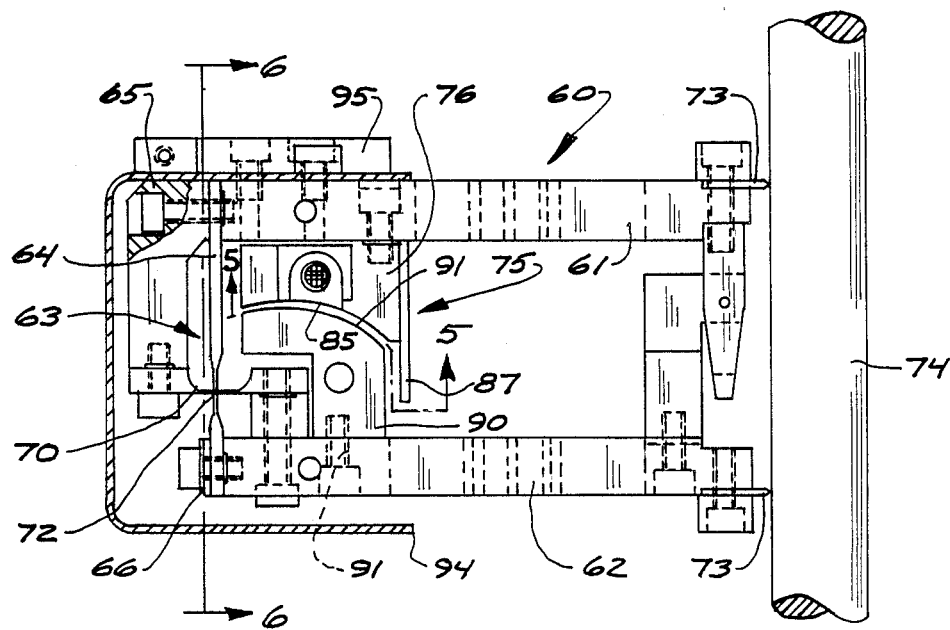
FIG. 4 is a side elevational view of a preferred form of the capacitive extensometer of the present invention illustrating a convex surface target and a mating complementarily-shaped surface on a capacitive reactance probe.

FIGS. 1 and 2 show an extensometer assembly indicated generally at 10, having a first arm 11, and a second arm 12 mounted together with a flexure assembly 13 comprising a first flexure strap or member 14 and a second flexure strap or member 15. This is a conventional cross flexure mounting assembly wherein the planes of the flexure members intersect and the flexure member 15 passes through an opening in the center of the flexure member 14. One end of the flexure strap or member 15 is clamped with a suitable clamp plate 16 to a block 19 which is used to clamp flexure member 14 to the arm 11. The other end of the flexure member 15 is clamped to the arm 12 with a clamping block indicated at 18 fixed to arm 12. A plate 18A is used to clamp the end of strap 15 to the block 18. As stated, one end of flexure member 14 is clamped to the end of the arm 11 with block 19, and the opposite end of the flexure member 14 is clamped with clamp member 19A to the end of arm 12.

The arms 11 and 12 have suitable knife edges 20 for engaging a specimen to be tested, and an over travel stop assembly 21 that is used in a normal manner.

A capacitive type sensing assembly is shown at 23, and utilizes a capacitive reactance type proximity detector 24 mounted on a suitable adjustable bracket 25 that clamps the proximity detector (which is cylindrical as can be seen in FIG. 2) in position. An adjustable clamp 26 is used for clamping the bracket 25 to the arm 11 and permitting it to be adjusted in position longitudinally along the arms 11 toward and away from a conductive target member indicated generally at 30 which can be sensed by the proximity detector 24. The target 30 is made to slide along the arm 72 and can be secured with a clamp 31 that can be loosened for permitting the target 30 to be slid longitudinally, and then reclamped with the target in the desired position.

The arm 11 as shown comprises two parallel side legs 11A and 11B which receive the clamp 26. The arm 12 has a pair of legs 12A and 12B that receive the clamp 31.

As can be seen in FIG. 2, the proximity detector 24 includes a first center circular capacitive plate 33 and a second outer concentric sleeve-type capacitive plate 34, commonly called a guard ring. These plates 33 and 34 are electrically insulated from each other and comprise capacitive reactance detectors to detect the gap between the target member 30, in particular, the surface 30A of the target member 30, and the adjacent end of the proximity detector 24. This gap is shown at 35 in FIG. 1 and it can be seen that by making the surface 30A other than a cylindrical surface concentric with the axis of pivot 36 of the flexure members 14 and 15, the proximity detector 24 will move toward or away from the surface 30A as the arms 11 and 12 pivot toward and away from each other as a specimen which the knife edges 20 are engaging is loaded. The change in relative position of the arms 11 and 12 is detected by the proximity detector 24. The proximity detector is connected to conventional circuitry 37.

The curve of the target surface 30A is other than an arc centered on axis 36, so mechanical compensation is possible.

FIG. 3 shows a modified target member and proximity detector mounted on arms 11 and 12 of extensometer 10. A proximity detector 44 which is constructed the same as detector 24 is mounted in a bracket 45 that includes a clamp 45A to hold the bracket relative to target member 46, which is mounted on arm 12 with a clamp 47. The target member 46 has a convex surface 48. The sensing end surface 49 of the proximity detector 44 is formed into a radius that generally corresponds to the radius of the surface 48, so that as the proximity detector moves, the effects of changing spacing at the outer peripheral edges of the proximity detector or probe, commonly called the fringe effects, are minimized. The center of the arc of surface 48 is also positioned so the gap between surface 48 and surface 49 of the proximity detector changes as the extensometer arms 11 and 12 pivot.

When using a capacitive reactance proximity detector such as those shown at 24 and 44, the sensing circuitry uses a constant current circuit system and the output will be variable voltage. With a constant current sensing circuit the voltage output from the circuitry 37, using capacitive reactance detectors 24 or 44, is basically linear with gap change except for second and third order effects, as distinguished from pure capacitance sensors.

Since it is known that even with the proximity detectors there is a certain nonlinear output in the constant current circuitry, due to "fringe" effects and the like, the target surfaces can be configured for compensation. In FIG. 1, a concave surface is shown as a target surface for a proximity detector and by making the radius of the surface 30A a smaller or larger radius than the radius of movement of the extensometer arms, nonlinear changes in the gap will result in variation in output signals which can be selected to compensate to a certain extent at least, nonlinearities of the constant current output circuitry. Using the extensometer geometry, one can vary the incremental change in spacing of the probe and target surface at different positions of the extensometer arms by moving the center of the arc of the curved concave surface 30A in a selected direction from its normal location, which would be generally along a bisecting plane of the flexure member 14. Usually, the center for the arc of surface 30A would be at a center point shown at 30B. The center of the arc for surface 48 is at a centerpoint 50 so that as the extensometer arms 11 and 12 tend to separate, the proximity detector or probe then would move farther away from the target surface for each degree of pivoting of the arms as the spacing between the outer ends of the extensometer arms increases. The distance that the center 30B or the center 50 is offset vertically from the pivot axis 36 of the arms determines the gain or span of the output.

There is a nonlinearity in proximity probes or detectors such as those shown at 24 and 44. The proximity detectors have a slight droop to their output curve when output is plotted relative to spacing from a target surface, and this is primarily caused by fringe effects such as stray capacitive reactance signals along the edges of the detector as the spacing increases. By properly selecting the target surface curvature, and also selecting the position of the center of the curvature of the target surface relative to the pivoting axis of the arms, certain nonlinearities can be compensated for. A "best fit" approximation for linearity can be made by calibration and experimentation and some linearity compensation can be achieved by making the radius of the curvature of the target surface longer or shorter. For example, moving the center 30B or the center 50 horizontally from the position shown in FIGS. 1 and 3 will provide linearity compensation. Thus, the center of arc is located to achieve desired range or gain as well as some linearity compensation and the radius of the target surface also is selected to aid linearization.

Figure 5:
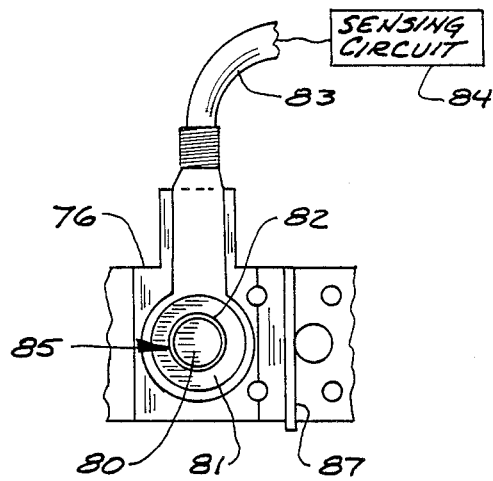
FIG. 5 is a bottom view of the probe of FIG. 4 taken on line 5—5 in FIG. 4.
Figure 6:
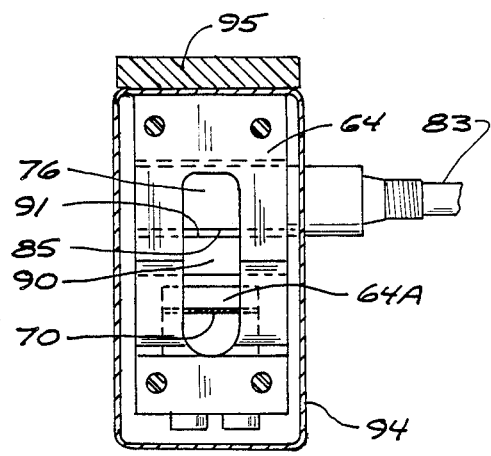
FIG. 6 is a sectional view taken on line 6—6 in FIG. 4.

In FIGS. 4, 5 and 6 a preferred form of the invention is shown, which comprises an extensometer 60 that has a first arm 61, and a second arm 62 made substantially similar to the arms previously mentioned, and which are joined together with respect to each other through the use of a cross-flexure mounting arrangement shown generally at 63. The cross-flexure arrangement includes a first flexure strap 64 that is clamped with a clamp block 65 to the outer end of the arm 61, and the opposite end of the flexure strap 64 is clamped with a suitable clamp 66 to the lower arm 62.

The block 65 has a depending leg, on which a second cross-flexure strap 70 is mounted. As can be seen in FIG. 6, the strap 64 has a central opening 64A through which the center part of the strap 70 passes. The strap 70 is narrowed down where it passes through the opening 64A, in a conventional manner, and the intersection point indicated generally at 72 of the flexure straps provides a hinge axis for movement of the outer ends of the arms 61 and 62. As shown, the outer ends of the arms carry knife points or specimen engaging members 73,73 which are engaging a specimen 74. As the specimen 74 is elongated (or shortened under compression), the arms will move relative to each other. The knife edges 73 are held against the specimen 74 in a suitable manner (not shown) such as spring clips, or even rubber bands that cause the knife edges to engage the side surface of the specimen 74.

A capacitive reactance sensing assembly 75 is mounted between the arms 61 and 62, and as shown includes a sensor detector module 76 that comprises a capacitive reactance-type proximity detector of the general type previously explained. As can be seen in FIG. 5, the module 76 includes a central electrode 80, and an outer annular sleeve-type electrode or guard ring 81 which are separated by an insulating ring 82, usually of a ceramic material. The outer ring of the probe can be encased in a suitable ceramic insulating material as well, and leads 83 are provided for connection to circuitry 84 for sensing the output of the proximity detector 76.

The detector module 76 is held in place on the arm 61, adjacent to the flexure strap 64, and with the proximity sensing surface 85 facing toward the arm 62. The sensing surface 85 is formed into a concave shape having an axis generally parallel to the pivot axis 72, but offset therefrom by a selected distance. The detector module 76 includes a shield panel 87 at the edge thereof most closely toward the knife edges 73.

The sensing assembly 75 further includes a target member 90, which is mounted with a suitable clamp onto the arm 62 (screws such as those shown at 91 are passed through the arm 62 into the target). The target 90 is positioned to be in alignment with the detector module 76 and has a complementary exterior convex surface 91 on the upper surface thereof that mates with and is spaced from the concave surface 85 of the detector module 76 when the arms are in their "zero" or reference position as shown in FIG. 4.

The guard panel 87 overlaps the forward surface of the target 90, and minimizes the likelihood of foreign material getting into the gap area between the surfaces 85 and 91. The surface 91 can have an axis of curvature parallel to the arm pivot axis 72 but is offset from the pivot axis 72. Surface 91 has a configuration formed by having the axis for the surface adjacent to the axis used for generating the surface 85 when the arms 61 and 62 are compressed fully together. Mechanical compensation for non-linearities in the sensing output can be obtained by changing the location of the center of radius of target surface 91 relative to the arm pivot axis 72. The linearity compensation of the output is changed by moving the center of the radius for the surface 91 in direction generally parallel to flexure strap 64, or up and down in FIG. 4.

The target surfaces do not have to have a uniform radius curve, but could have a changing radius along the surface. The surface 91 extends laterally across the extensometer and matches the width of the detector module.

An outer shield or housing 94 is provided over the cross-flexure assembly 63 and the sensor assembly 75, to shield and protect the components from foreign materials during use. This housing can be a deep drawn cover that fits over the end portion of the extensometer. The cover is made to have adequate clearance for relative movement between the arms 61 and 62, and is clamped in place onto the arm 61 using a clamp block 95 and suitable set screws threaded into the arm 61.

While various methods of hinging the extensometer arms are possible, when using capacitive sensing it can be seen that any looseness or compliance in the hinge can be very detrimental. The cross flexure mounting is very rigid in resisting side to side arm movement and is thus very effective.

The electronics used may be commercially available capacitive sensing circuits.

The extensometer arms are very rigidly connected together with either a cross flexure assembly or parallel flexure straps so that the arms do not move laterally relative to each, but yet move easily relative to each other in the desired direction, and permit the capacitance sensors to be mounted to sense arm movements.

Low cost, reliable operation is thus achieved.

Although the present invention has been described with reference to preferred embodiments, workers skilled in the art will recognize that changes may be made in form and detail without departing from the spirit and scope of the invention.

What is claimed is:

1. A capacitive extensometer assembly comprising;
   a first mounting arm member, and a second mounting arm member;
   means for pivotally connecting said first and second mounting arm members together to form an extensometer assembly for permitting relative movement between first ends of the mounting arm members;
   means at said first ends of the mounting arm members for engaging a specimen to be tested; and
   a sensor mounted on the first and second mounting arm members to sense movement between the first and second mounting arm members, said sensor including two portions comprising a proximity detector member having an end surface for sensing proximity to an adjacent surface mounted on the first mounting member, and a target member mounted on the second mounting arm member, said proximity detector and target member having surfaces that face each other and which are spaced apart to form a gap when the first and second mounting arm members are in a reference position and wherein the spacing of the proximity detector and target increases as the first ends of the mounting arm members move apart, the surface of the proximity detector facing the target member surface being formed to be at least partially curved about an axis, which axis is offset from the pivot axis of relative pivotal movement of the first and second arm members so changes in the relative position between the first and second portions of the sensor change as the first mounting arm member and second mounting arm member move.

2. The apparatus of claim 1 wherein the target surface of the target member is made as a convex surface and the end surface of the proximity detector is concave.

3. The apparatus of claim 1 wherein the first and second mounting arm members comprise elongated arms, and flexure strap means for pivotally mounting the mounting arm members comprising crossed flexure straps each connected to the first and second elongated arms at second ends thereof, said crossed flexure straps forming a pivot axis for guiding movement of the first ends of said elongated arms.

4. The apparatus of claim 1 wherein said target surface is convex, and the end surface of said proximity detector is concave, said target surface being mounted on said second mounting arm member between the first and second mounting arm members, and facing generally toward said first mounting arm member, and the end surface of said proximity detector facing in the opposite direction.

5. The apparatus as specified in claim 2 and a panel shield member carried by one of the portions of the sensor and extending toward the other portion of the sensor and shielding a gap between the proximity detector and target member when the first and second members are at the reference position.

6. The apparatus of claim 1 wherein the means for pivotally connecting the first and second mounting arm members comprises means defining a pivot axis, said target surface is generated about an axis which is parallel to and spaced from the hinge axis.

* * * * *